/ United States Patent (12)
Kizhepat et al.

(10) Patent No.: US 7,493,481 B1
(45) Date of Patent: Feb. 17, 2009

(54) DIRECT HARDWARE PROCESSING OF INTERNAL DATA STRUCTURE FIELDS

(75) Inventors: Govind Kizhepat, Los Altos Hills, CA (US); Kenneth Y Choy, Castro Valley, CA (US); Suresh Kadiyala, Cupertino, CA (US)

(73) Assignee: NetXen, Inc., Cupertino, CA (US)

( * ) Notice: Subject to any disclaimer, the term of this patent is extended or adjusted under 35 U.S.C. 154(b) by 416 days.

(21) Appl. No.: 10/848,485

(22) Filed: May 17, 2004

(51) Int. Cl.
*G06F 9/00* (2006.01)
*G06F 7/00* (2006.01)

(52) U.S. Cl. ............... 712/300; 712/225; 712/224

(58) Field of Classification Search ............ 712/224, 712/300, 225
See application file for complete search history.

(56) References Cited

U.S. PATENT DOCUMENTS

| | | | |
|---|---|---|---|
| 5,673,321 A | 9/1997 | Lee | |
| 5,793,954 A * | 8/1998 | Baker et al. | 709/250 |
| 5,838,984 A * | 11/1998 | Nguyen et al. | 712/5 |
| 5,937,169 A * | 8/1999 | Connery et al. | 709/250 |
| 5,995,746 A * | 11/1999 | Sites et al. | 712/220 |
| 6,061,783 A * | 5/2000 | Harriman | 712/224 |
| 6,151,705 A * | 11/2000 | Santhanam | 717/153 |
| 6,308,253 B1 * | 10/2001 | Gadre et al. | 712/41 |
| 6,314,504 B1 * | 11/2001 | Dent | 711/212 |
| 6,330,659 B1 | 12/2001 | Poff et al. | |
| 6,356,951 B1 * | 3/2002 | Gentry, Jr. | 709/250 |
| 6,820,195 B1 * | 11/2004 | Shepherd | 712/300 |
| 6,950,922 B2 * | 9/2005 | Chung et al. | 711/220 |
| 2001/0016901 A1 * | 8/2001 | Topham | 712/217 |
| 2006/0294510 A1 * | 12/2006 | Hank et al. | 717/151 |

OTHER PUBLICATIONS

John Hennessy and David Patterson; "Computer Architecture a quantitative approach", third edition. pertinent pp. 97-99.*
A. Murat Fiskiran and Ruby B. Lee "Performance impact of addressing modes on encryption algorithsm".*

* cited by examiner

*Primary Examiner*—Eddie P Chan
*Assistant Examiner*—Idriss N Alrobaye
(74) *Attorney, Agent, or Firm*—Law Office of Andrei D. Popovici, P.C.

(57) ABSTRACT

In some embodiments, the execution of load and store instructions for internal fields of data structures is accelerated by using on-chip template registers and appropriate machine code instructions. A load/store machine code instruction comprises an identifier of a memory address offset of an internal field word relative to a base address of the data structure, an identifier of an intra-word start bit of the internal field, and an identifier of an intra-word length of the internal field. The three identifiers may coincide, for example if the three identifiers are represented by an identity of a template register storing a template entry including the memory address offset, the start position, and the field length. The three identifiers may also be provided as part of a machine code instruction itself. Further provided are compilers, compiler methods, and hardware systems for implementing accelerated internal-field load and store operations.

20 Claims, 5 Drawing Sheets

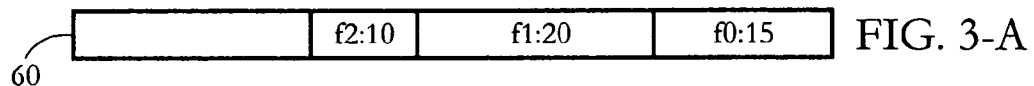
FIG. 3-A
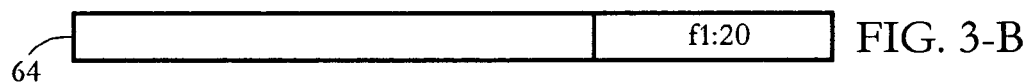
FIG. 3-B
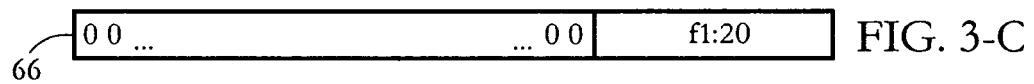
FIG. 3-C
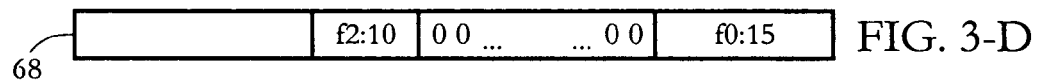
FIG. 3-D
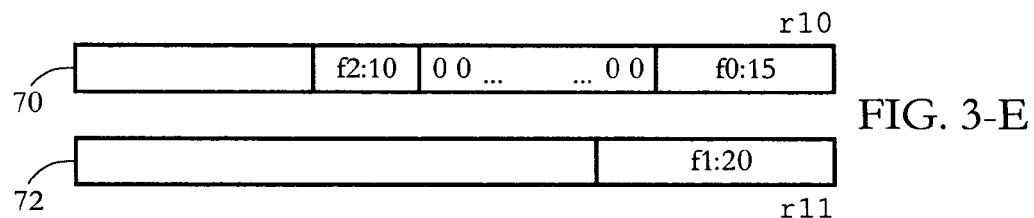
FIG. 3-E

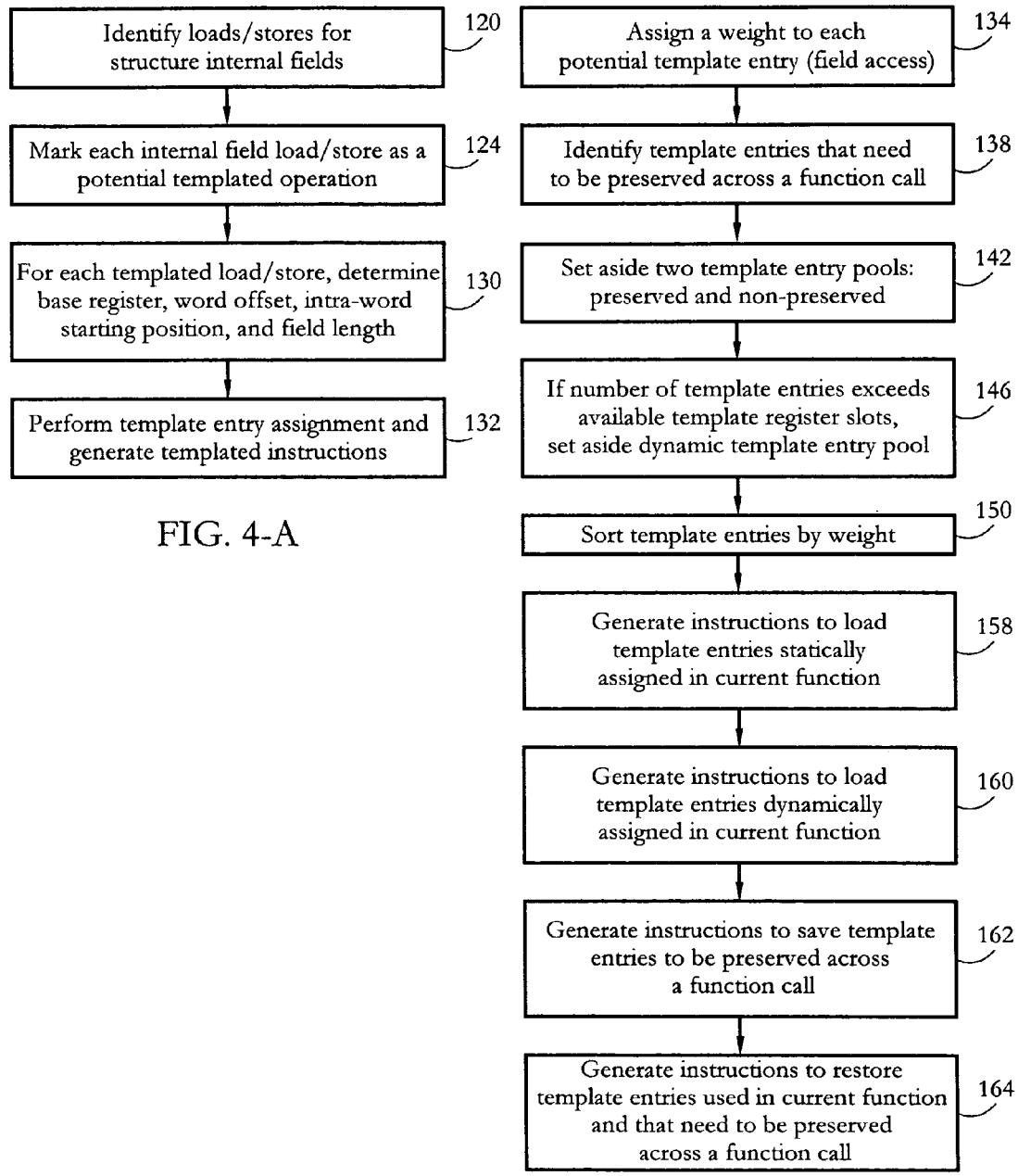
FIG. 4-A
FIG. 4-B

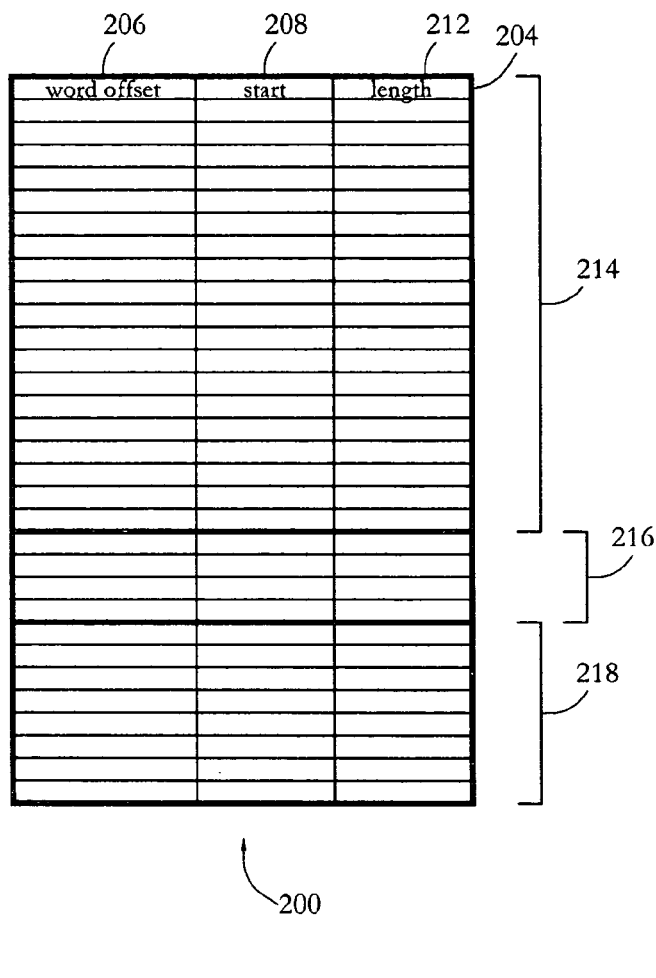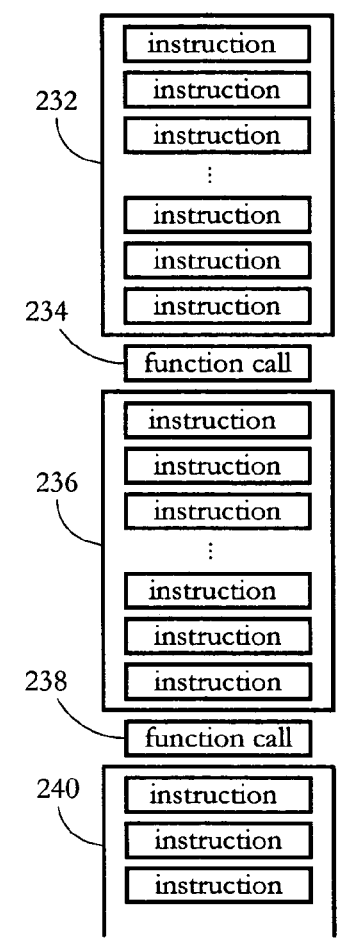
FIG. 5-A
FIG. 5-B

DIRECT HARDWARE PROCESSING OF INTERNAL DATA STRUCTURE FIELDS

FIELD OF THE INVENTION

The invention in general relates to data processing systems, and in particular to data processing and compiling systems and methods for performing memory access (load/store) operations.

BACKGROUND

Computer programmers ordinarily write software programs in human-readable high-level languages such as C or C++. Such a program is normally translated by a compiler to lower-level machine code, which is executed by a processor. High-level languages are not hardware-specific: a programmer writing a C or C++ program need not necessarily know the specific type of hardware system that the program will run on. High-level languages can represent relatively complex algebraic and boolean operations, which can be performed on various variable types and complex data structures. High-level languages include representations of operations such as multiplication and division, as well as relational and logical operations such as AND, OR, greater than, and less than or equal to, among others. Commonly used variable types include character (denoted in C as char), integer (int), including short integer (short) and long integer (long), single-precision floating point (float) and double-precision floating point (double). Data structures may include arrays, as well as more complex structures including multiple fields of various types.

Consider for example a database containing personal information for a number of persons. Such a database may store a number of personal records, each organized as prescribed by a data structure. A data structure representing a personal record may have various fields, each representing some part of the personal record, such as a name, address, and date of birth associated with that personal record. Some fields of the data structure may include character arrays, while others may include integers or floating point numbers.

The central processing unit (CPU) of a computer normally operates on hardware-specific, low-level machine code. Machine code ordinarily consists of a sequence of binary numbers (a sequence of ones and zeros), which represent low-level operations to be performed by the processor. Such operations include moving data between registers and memory, and performing additions and subtractions on the contents of specified registers. Machine code represented as sequences of binary or hexadecimal numbers is difficult to read by humans. The various low-level machine-code operations can be represented in text form, or assembly language, which is easier to read by humans. Translating between assembly language and machine language is a relatively simple process: each assembly language instruction represents a single machine instruction.

A compiler is a computer program that translates high-level source code into assembly language or machine language code. Each high-level language statement may be translated into a large number of corresponding machine code instructions. In effect, a compiler translates a relatively small number of complex, human-readable instructions into a larger number of simpler, machine-readable instructions. Generating machine code using a compiler is considerably faster and simpler than manually writing machine or assembly code. At the same time, conventional compilers may generate machine code of suboptimal computational efficiency. In particular, conventional systems may be inefficient in performing operations on internal fields of data structures.

SUMMARY OF THE INVENTION

According to one aspect, the present invention provides a data processing method comprising: receiving an internal-field memory access machine code instruction for an internal field of a data structure, and executing the internal-field memory access machine code instruction. The internal-field memory access machine code instruction includes an identifier of a memory address offset of a word relative to a base address of the data structure, the word comprising the internal field, and an identifier of a field bitspan within the word. The identifier of the memory address offset and the identifier of the field bitspan are not necessarily distinct. Executing the internal-field memory access machine code instruction comprises performing an intra-word content modification operation on the word as at least part of a content of the word is transferred between a memory and a register.

According to another aspect, the present invention provides a data processing method comprising: receiving high-level source code containing a reference to an internal field of a data structure; and, from the high-level source code, generating a low-level language memory access instruction for the internal field. The low level language memory access instruction is an assembly language or a machine language memory access instruction. The low-level language memory access instruction includes an identifier of a memory address offset of the internal field relative to a base address of the data structure, and an identifier of a field bitspan within a word. The field bitspan defines a field start position and a field length. The identifier of the memory address offset and the identifier of the field bitspan are not necessarily distinct.

The use of hardware-accelerated internal-field load and store operations allows a reduction in the number of machine code instructions needed to perform operations on internal fields of data structures. Performing machine-code operations directly on internal fields of data structures allows an increase in system computational efficiency and speed.

BRIEF DESCRIPTION OF THE DRAWINGS

The foregoing aspects and advantages of the present invention will become better understood upon reading the following detailed description and upon reference to the drawings where:

FIGS. 3-A-E show a memory word configuration and corresponding register configurations illustrating several load and store operations performed according to some embodiments of the present invention.

FIGS. 4-A-B show sequences of steps performed by a compiler according to some embodiments of the present invention.

FIG. 5-A illustrates an exemplary data structure field template according to some embodiments of the present invention.

FIG. 5-B shows an exemplary sequence of machine code instructions including function calls, according to some embodiments of the present invention.

DETAILED DESCRIPTION OF THE INVENTION

In the following description, it is understood that all recited connections between structures can be direct connections or indirect connections through intermediary structures. A set of elements includes one or more elements. A plurality of elements includes two or more elements. Any recitation of an element is understood to refer to at least one element. Unless otherwise specified, an identifier of an element may be the element itself (e.g. a template entry or part of a template entry), a representation of the element (e.g. a representation of a register), or information distinct from the element that identifies the element. For example, an identifier of an element may include an identity of a register that stores the element. An identifier of a field bitspan includes identifiers of at least two of the following three parameters: field start bit, field length, and field end bit. Unless otherwise specified, the term "logic" refers to special-purpose hardware. Any sequence of steps may be, but need not necessarily be, performed in the order illustrated. Unless otherwise specified, the term "data structure" encompasses any source-code object including a data structure, such as struct data structures defined in C and classes defined in C++. A memory access operation may be a load operation or a store operation. A transfer between a memory and a register may be a transfer from the memory to the register or from the register to the memory. The term "low-level language" is understood to encompass assembly language and machine language.

The following description illustrates embodiments of the invention by way of example and not necessarily by way of limitation.

Figure 1:
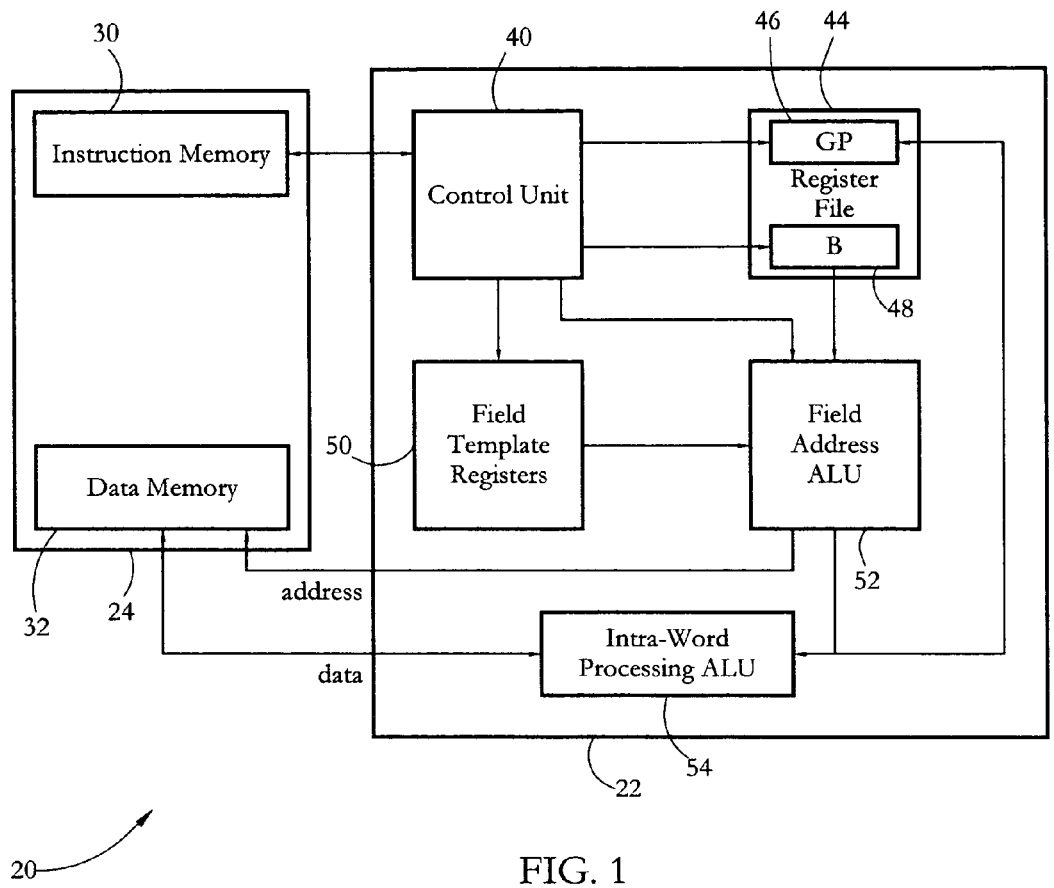
FIG. 1 is a schematic diagram of an exemplary data processing system according to some embodiments of the present invention.

FIG. 1 shows a schematic diagram of an exemplary data processing system 20 according to an embodiment of the present invention. Data processing system 20 includes a programmable general-purpose processor 22 and a random access memory 24. Random access memory 24 may include a static random access memory (SRAM) or a dynamic random access memory (DRAM) such as a synchronous dynamic access memory (SDRAM). Random access memory 24 may be a cache. Memory 24 includes an instruction memory 30 and a data memory 32. Instruction memory 30 and data memory 32 may include distinct physical memory units, or may correspond to different memory address ranges within a single physical memory unit.

Processor 22 includes a control unit 40 connected to instruction memory 30, a register file 44 connected to control unit 40, a set of field template registers 50 connected to control unit 40, a field address arithmetic logic unit (ALU) 52 connected to register file 44, template registers 50, and data memory 32, and an intra-word processing ALU 54 connected to data memory 32 and register file 44. Register file 44 includes a set of general-purpose (data) registers 46, and a set of base (address) registers 48. In some embodiments, template registers 50 may be provided as part of register file 44. Field-address ALU 52 and/or intra-word processing ALU 54 may form part of a larger ALU having multiple ALU units.

Processor 22 comprises logic configured to perform direct, templated load and store operations for data structure internal fields stored as internal bitfields of memory words, as described in detail below. In a load operation, internal field data stored in data memory 32 is loaded into a data register 44. In a store operation, internal field data from a data register 44 is stored in data memory 32. Control unit 40 sequentially fetches instructions to be executed from instruction memory 30, and determines whether an instruction is an accelerated (templated) instruction or a standard, non-accelerated instruction. Template registers 50 hold a number of template entries each corresponding to a field of a data structure. Each template entry identifies a field word offset relative to a base address of the data structure, and an intra-word field bitspan. The bitspan defines the field start bit, length, and end bit. Generally, an identifier of the field bitspan may contain at least two parameters selected from the field start bit, length, and end bit. In some embodiments, the data stored in template registers 50 may be stored in instruction memory 30, and retrieved by control unit 40 as part of each fetched instruction.

Register file 44 may be a conventional register file storing base addresses for data structures, and various other data used in the operation of processor 22. Field address ALU 52 generates a memory address for the internal field using the template entry for the internal field, and the base address for the data structure corresponding to the internal field. Intra-word processing ALU 54 performs intra-word operations such as extract, sign, and mask on memory words that include the target internal field, as the memory words are transferred between data memory 32 and data registers 44. The intra-word operations performed by intra-word processing ALU 54 depend on an opcode received from control unit 40, and a template entry for the target internal field received from template registers 50.

Consider an exemplary internal-field load operation to be performed by processor 22. Control unit 40 retrieves an internal-field load instruction from instruction memory 30. The internal field load instruction identifies an internal field of a data structure. In one embodiment, the load instruction comprises identifiers of a destination register, a template entry for the internal field, and a base register which holds a base address for the data structure. The template entry identifier may be a template index, or an identity of a register storing the template entry. Control unit 40 sends the template entry identifier to template registers 50, which in turn send the identified template entry to field address ALU 52 and intra-word processing ALU 54. In one embodiment, the entire template entry may be sent to both ALUs 52, 54. The template entry sent to intra-word processing ALU 54 may be sent through field address ALU 52. In some embodiments, only a word offset part of each template entry is sent to field address ALU 52, while only a part of each template entry needed for intra-word operations is sent to intra-word processing ALU 54. Control unit 40 sends the base register identifier to base registers 48, which send the identified base address to field address ALU 52. Control unit 40 also sends an opcode identifying the type of instruction to be executed to field address ALU 52 and to intra-word processing ALU 54.

Field address ALU 52 uses the template entry and base address to determine an address of a target memory word containing the field of interest. The address of the target memory word is generated by adding to the base address a number of memory words determined from the template entry. Field address ALU 52 sends a load command identifying the target memory word address to data memory 32. In response to the load command, data memory 32 sends the requested memory word to data registers 46, through intra-word processing ALU 54. Intra-word processing ALU 54 may perform one or more intra-word operations on the memory word received from data memory 32. The intra-word operations performed by intra-word processing ALU 54 depend on the opcode received from control unit 40, and the template entry for the field of interest. Intra-word processing ALU 54 transmits the memory word to data registers 46 after having performed the intra-word operation(s).

In an internal-field store operation, control unit 40 retrieves an internal-field store instruction from instruction memory 30. The internal field store instruction identifies an internal field of a data structure. In one embodiment, the store instruction comprises identifiers of a source register, a template entry for the internal field, and a base register which holds a base address for the data structure. The template entry identifier may be a template index, or an identity of a register storing the template entry. Control unit 40 sends the template entry identifier to template registers 50, which in turn send the identified template entry to field address ALU 52 and intra-word processing ALU 54. Control unit 40 sends the base register identifier to base registers 48, which send the identified base address to field address ALU 52.

Field address ALU 52 uses the template entry and base address to determine an address of a target memory word where the field of interest is to be stored. The address of the target memory word is generated by adding to the base address a number of memory words determined from the template entry. Field address ALU 52 sends a store command identifying the target memory word address to data memory 32. In response, data memory 32 receives the requested field data from data registers 46, through intra-word processing ALU 54. Intra-word processing ALU 54 may perform one or more intra-word operations on the memory word received from data registers 46. The intra-word operations performed by intra-word processing ALU 54 depend on the opcode received from control unit 40, and the template entry for the field of interest. Intra-word processing ALU 54 transmits the processed memory word to data memory 32 for storage.

Figure 2:
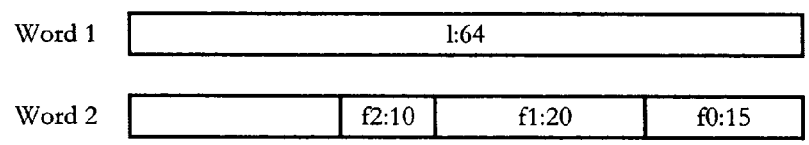
FIG. 2 illustrates an arrangement within two memory words of the fields of an exemplary data structure, according to some embodiments of the present invention.

The operation of system 20 according to one embodiment can be better understood by considering load and store operations performed on an exemplary internal field of a data structure. Consider an exemplary data structure struct foo {long 1:64; long $f_0$: 15; long $f_1$: 20; long $f_2$: 10}. The data structure foo has four fields: a 64-bit long integer 1, a 15-bit long integer $f_0$, a 20-bit long integer $f_1$, and a 10-bit long integer $f_2$. As discussed above, a data structure may include variable types other than long integers, including arrays of variables, and including other data structures. The various fields of the data structure are stored in contiguous spaces in memory. FIG. 2 illustrates schematically the memory space taken by an instance of the data structure foo, for a 64-bit architecture. The integer 1 is stored in a first word Word1, while the integers $f_0$, $f_1$ and $f_2$ are stored in a second word Word2.

A software call to the internal field $f_1$ is translated by the system compiler into a set of machine-language instructions to be stored in the instruction memory. In the discussion below, for clarity, the machine-language instructions will be represented in assembly language form. In one embodiment, the compiler is capable of generating six types of accelerated (templated) internal field commands: four types of load commands, and two types of store commands. The load commands include a simple (whole-word) load command ld, a load-and-extract command lde, a load-extract-and-sign command ldes, and a masked-load command ldm. The store commands include a simple (whole-word) store command st, and a masked-store command stm. The masked store command stm is used after execution of a corresponding masked load command ldm. Intra-word processing ALU 54 performs intra-word processing on data loaded and stored in response to the commands lde, ldes, ldm and stm. Intra-word processing ALU 54 does not modify data loaded and stored in response to whole-word load and store commands ld and st. Each command is described in detail below.

In one embodiment, each templated load command has a form $$\text{load } rd = tn[i](\text{base}), \quad [1]$$

wherein load stands for one of the four load commands ld, lde, ldes, and ldm listed above, rd is one of 16 general-purpose registers r0-r15, tn[i] is the i-th entry of the template table tn, n=0,1, i=0-31, (i.e. one of the 32 entries of a template table t0 or t1), and base is one of a plurality of base registers m0b0 to m1b3, where m0 and m1 denote separate base register pools corresponding to two distinct data memories, and b0-b3 denote different registers within the same pool. Using two separate memories, each with its own template table, allows increasing the available system memory bandwidth. A machine-language representation of an instruction such as the one shown in eq. [1] may be a sequence of bits including several subgroups: an opcode, a template status indicator indicating whether the operation is a templated one or not, a template entry identifier, and an identifier of a base register.

Different variables (instances) of a certain data structure type employ the same template entries, but have different associated base registers and addresses. In one embodiment, each template entry tn [i] is a 24-bit number including a 12-bit field word offset, a 6-bit intra-word field start position, and a 6-bit field length. If one or more of the fields of the data structure is a large array, the word offset for subsequent fields may be higher than $2^{12}$, and its storage would use more than 12 bits. In one embodiment, a different base address is used for such subsequent fields. Such a data structure then corresponds to two or more base addresses, wherein each base address corresponds to a subset of the data structure fields.

For the bitfield $f_1$ illustrated in FIG. 2, the corresponding template entry designates a word offset of 1, an intra-word offset of 15, and a field length of 20. An instruction to load a memory word containing the field $f_1$ into a register r10 may have a form $$ld\ r10 = t0[2](m0b0), \quad [2]$$

wherein t0[2] is the template entry corresponding to the field $f_1$, and m0b0 is the base register storing the base address for the particular data structure of type foo whose $f_1$ field is to be loaded into the register r10. In a simple load operation id, the entire word comprising the field of interest is loaded from memory into the designated register. FIG. 3-A illustrates a memory word 60 containing the field $f_1$. The corresponding contents of a register r10 are identical to memory word 60 after the whole-word load command shown in Eq. [2] is completed.

In a load-and-extract operation lde, the field of interest is selectively loaded directly into the destination register, in a shifted position. FIG. 3-B illustrates the contents 64 of register r10 after an instruction lde r10=t0[2] (m0b0) is completed. As shown, register r10 includes the field $f_1$, starting at the first register bit. Intra-word processing ALU 54 (shown in FIG. 1) receives the target memory word 60 shown in FIG. 3-A, and sends the contents 64 shown in FIG. 3-B to register file 44 for storage in register r10. Intra-word processing ALU 54 generates the contents 64 by right-shifting the bits of memory word 60 by 15 bits, i.e. by the intra-word start position defined by the template entry t0[2]. The operation lde r10=t0[2] (m0b0) may be represented as $$r10 = ((\text{base}+\text{offset}) >> \text{start}) \& ((1 << \text{length})-1), \quad [2a]$$

wherein & represents the bitwise AND operator, >> represents the right shift operator, << represents the left shift operator, offset is the word offset specified by the template entry t0[2], base is the base address specified by the base register m0b0, (base+offset) represents the contents of the memory word at that address, and start and length represent the bitfield start position and length, respectively, specified by the template entry t0[2].

In a load-extract-and-sign operation ldes, only the field of interest is loaded into the destination register, starting at the first register bit, and the rest of the register bits are filled with a sign extension (e.g. 0 for positive, 1 for negative). FIG. 3-C illustrates the contents 66 of register r10 after a command ldes r10=t0[2] (m0b0) is completed. Register r10 includes the field $f_1$ in a shifted position, and the rest of the register bits are set to 0, for example. The sign extension may be determined by a sign bit present within the target memory word. Intra-word processing ALU 54 receives the target memory word 60 shown in FIG. 3-A, and sends the contents 66 shown in FIG. 3-C to register file 44 for storage in register r10. Intra-word processing ALU 54 generates the contents 66 by right-shifting the bits of memory word 60 by the intra-word start position defined by the template entry t0[2], and setting to a desired sign value the bits subsequent to the field length defined by the template entry t0[2]. For a 64-bit architecture, the operation ides r10=t0[2] (m0b0) may be represented as $$r10=((base+offset)<<(64-start-length))>>(64-length), \quad [2b]$$

wherein the operators and variables in Eq. [2b] are those described above with reference to Eq. [2a].

In a masked-load operation ldm, the contents of the memory word containing the field of interest are loaded into the destination register, except that the field of interest is zeroed out. FIG. 3-D illustrates the contents 68 of register r10 after an instruction ldm r10=t0[2] (m0b0) is completed. Register r10 includes the field $f_0$ and $f_2$ in their original positions, and zeroes for the bits corresponding to the position of field $f_1$. Intra-word processing ALU 54 receives the target memory word 60 shown in FIG. 3-A, and sends the contents 68 shown in FIG. 3-D to register file 44 for storage in register r10. Intra-word processing ALU 54 generates the contents 68 by setting to zero a number of bits equal to the field length defined by the template entry t0[2], starting at the intra-word start position defined by the template entry t0[2]. The operation ldm r10=t0[2] (m0b0) may be represented as $$r10=((base+offset)\&\sim(((<<length)-1)<<start), \quad [2c]$$

wherein ~ represents the bitwise complement operator, and the other operators and variables in Eq. [2c] are those described above with reference to Eq. [2a].

In one embodiment, each templated store instruction has a form selected from $$st\ tn[i]\ (base)=rs, \quad [3a]$$

$$stm\ tn[i]\ (base)=rs1,rs2, \quad [3b]$$

wherein r s is one of 16 general-purpose registers r0-r15. FIG. 3-A shows memory word 60 after the identical contents of register r10 are stored in memory in response to the instruction st t0[2] (m0b0)=r10. As illustrated, the whole-word (simple) store instruction st is the reciprocal of the whole-word load command ld.

FIG. 3-E illustrates the contents 70, 72 of two registers r10, r11, respectively, that result in the configuration of memory word 60 shown in FIG. 3-A following execution of the instruction stm t0[2] (m0b0)=r10, r11. Intra-word processing ALU 54 receives the contents 70, 72 from register file 44, and sends memory word 60 for storage in memory. The first 20 bits of the register r11 (the length of the field $f_1$ defined by the template entry t0[2]) are shifted left by 15 bits (the intra-word offset defined by the template entry t0[2]), and bitwise OR-ed with the contents of register r10. The operation stm t0[2] (m0b0)=r10, r11 may be represented as $$(base+offset)=r10|((r11\&((1<<length)-1)<<start), \quad [3c]$$

wherein | represents the bitwise OR operator, and the other operators and variables in Eq. [3c] are those described above with reference to Eq. [2a].

Prior to execution of the masked-store instruction stm t0[2] (m0b0)=r10, r11, an instruction of the form mov r11=0x3 may be used to set an exemplary desired value 0x3 to the contents of register r11, and a masked-load instruction ldm r10=t0[2] (m0b0) may be used to generate the masked configuration of register r10 shown in FIG. 3-E. Thus an instruction sequence (ldm, mov, stm) as described above may be used to store a desired value of an internal field of a data structure directly in an internal position within a target memory word.

FIGS. 4-A and 4-B illustrate schematically a sequence of steps performed by a compiler according to an embodiment of the present invention. FIG. 4-A shows a number of preliminary analysis steps 120, 124, 130 performed before a template assignment phase illustrated at 132. FIG. 4-B shows a sequence of steps performed during the template assignment phase.

As discussed above, a compiler translates input source code into output low-level code such as assembly code or machine code. The following discussion will focus on machine code, but generally may apply to assembly code as well. The input source code contains definitions of data structures having multiple fields. The output machine code includes load and store instructions corresponding to the data structure fields. The processing performed by a compiler may have a number of phases, which can be classified as front-end and back-end phases. The front-end phases may be largely hardware-architecture independent, while the back-end phases are hardware-dependent. Following front-end phases such as lexical, syntactic, and semantic (constraint) analysis, the compiler generates a parse tree, also called an abstract syntax tree. The parse tree contains the source code information in a tree data structure. In back-end phases such as code generation and optimization, the compiler uses the parse tree to generate machine code, and optimizes the machine code. The steps shown in FIGS. 4-A-B are preferably performed during code generation and optimization. The template assignment steps shown in FIG. 4-B may be performed after data flow analysis and loop detection, but before machine code instructions are first scheduled.

As shown in FIG. 4-A, memory access (load/store) operations for internal data structure fields are identified in a step 120. In one embodiment, the identification is performed by analyzing the parse tree generated by the compiler from the source code. In a step 124, each internal field load/store instruction is marked as a potential templated instruction. Preferably, all instructions marked as potentially templated will have the format illustrated in eqs. [1] and [3a-b] in the final machine code. In a step 130, a number of parameters are determined and carried for each templated load/store: a data structure base register, a field word offset, an intra-word starting position of the field, and a field length (step 130). In a step 132, a template entry for each templated access operation is assigned to a register of a template table, and templated machine code instructions are generated, as described below with reference to FIG. 4-B.

The template assignment steps shown in FIG. 4-B can be understood better by considering a template table configuration and an exemplary machine code instruction sequence according to an embodiment of the present invention. FIG. 5-A illustrates an exemplary 32-register template table 200. While machine code instructions corresponding to a given program function or section of a program function are being executed, template table 200 stores a plurality of template entries 204 corresponding to that program function or section of the program function.

A section of the function is defined by machine code bounded by function calls and/or the function ends. FIG. 5-B shows an exemplary machine code instruction sequence 230 for a first function. Instruction sequence 230 includes two function calls 234, 238 to a second and a third function, respectively. Function calls 234, 238 define the boundaries of three function code sections 232, 236, 240. When the execution of instruction sequence 230 reaches function call 234, execution continues with an instruction sequence of the second function, called by function call 234. The instruction sequence for the second function may in turn include function calls. When execution of the instruction sequence for the second function has completed, execution proceeds to the first instruction of section 236. The first instruction of section 236 is the instruction that immediately follows function call 234 in sequence 230.

As shown in FIG. 5-A, each template entry 204 corresponds to an internal field of a data structure employed by the function. Each template entry 204 includes a field word offset 206, an intra-word field starting position 208, and a field length 212. The plurality of template entries 204 may include a set of static non-preserved template entries 214, a set of dynamic (dynamically re-assignable) non-preserved template entries 216, and a set of static preserved template entries 218. Static non-preserved template entries 214 are template entries that are not replaced within the current section. The values of static non-preserved template entries 214 stored in the corresponding template registers may be replaced by other template entries during the execution of instructions within other sections. Static preserved template entries 218 are template entries that are preserved across a function call, and remain unchanged while the instructions of the current function are being executed. Dynamic template entries 216 are template entries that are dynamically assigned to template registers as needed during the execution of the current section.

In an exemplary configuration in which the number of internal data structure fields used by a function exceeds the size of template table 200, 20 registers are allocated to static non-preserved template entries 214, 4 registers to dynamic template entries 216, and 8 registers to static preserved template entries 218. In some configurations, for example if the total number of internal data structure fields is lower than the number of template registers, template table 200 may not include any dynamic template entries 216. In some configurations, template table 200 may consist solely of dynamic template entries. The description below will focus on an exemplary configuration employing three types of template entries.

A first set of template entry values are loaded into the template registers for execution of the first section 232. Additional dynamic template entries may be loaded into corresponding registers during the execution of the code of first section 232, as needed. When function call 234 is reached, the template register contents will be updated by machine code instructions corresponding to the second function. The machine code instructions of the second function include prologue instructions to save the 8 preserved template entries of the first function on the stack, instructions to load template entries used in various second function sections into the template registers, and epilogue instructions to restore the 8 preserved template entries of the first function before execution returns to the first function code. The process described above can be used recursively for additional functions called within the second function. After execution returns to the first function code, appropriate machine code instructions may be used to load desired template entry values used within second section 236 into the non-preserved static and dynamic template registers. Similarly, a new set of template entry values may be loaded for third section 240 after execution of the second function call 238.

As discussed above, the steps illustrated in FIG. 4-B may be performed during code generation, after data flow analysis and loop detection, but before machine code instructions are first scheduled. A set of machine code instructions including templated instructions is generated, but not necessarily scheduled, before the steps of FIG. 4-B are performed. In a step 134, each potential template entry used within a function is assigned a weight. In one embodiment, a weight assignment step is performed for each section of the function, and consequently a given template entry may have an associated weight for each section it is used in. A template entry may also have a single associated weight reflecting the usage of the template entry within the entire function. An assigned weight may depend on whether its associated template entry is used in a load or a store, on the number of times the template entry is referred to, and on the position of the references to the template entry within the code. In one embodiment, higher weights are assigned to template entries used in store operations than load operations. Assigned weights are higher for more frequently-referenced template entries, such as template entries within loops. Weights for entries referenced within nested loops may be higher than weights for entries referenced in outer loops.

A number of template entries that should be preserved across a function call are identified (step 138). These template entries are template entries whose usage is not localized to a single section of the function. Preserved template entries remain stored in the template table during the execution of instructions of multiple code sections.

In a step 142, two template register pools are tentatively set aside: a register pool for template entries that need to be preserved across a function call, and a register pool for template entries that do not need to be preserved across a function call. In an exemplary implementation described above, the preserved pool consists of 8 registers, while the non-preserved pool consists of 24 registers. In a step 146, a register pool for dynamically-changeable template entries is set aside if the number of non-preserved template entries to be assigned to the template table exceeds the total number of template registers available in the template table for a code section. In an exemplary implementation, 4 out of 24 non-preserved registers are set aside for dynamic template entries if a given code section uses more than 24 non-preserved template entries. A dynamic template entry pool is not used if there are fewer non-preserved template entries than available non-preserved template registers.

In a step 150, the template entries are sorted by weight. The sorting process for the non-preserved entries may be performed individually for each code section, using the weights assigned for that code section. In subsequent steps, the compiler generates machine code instructions to load the template entries into corresponding template registers, as well as final templated instructions for internal field memory access operations. In one embodiment, the compiler assigns template entries to registers sequentially in decreasing order of weight, starting with the template entry with the highest weight, while making sure that each template entry is assigned to its corresponding preserved or non-preserved register pool.

In a step 158, static template entries are assigned to corresponding registers in order of decreasing weight. Assigning a template entry to a corresponding register includes generating a machine code instruction that sets the register contents to the desired template entry value, as well as setting each memory access operation corresponding to that template entry to refer to the assigned template register. For example, assigning a hexadecimal value 0xa to a register r20 may be achieved using a machine code instruction of the form mov r20=0xa. Template entries to be preserved across a function call are assigned to corresponding registers in the preserved register pool, while template entries that need not be preserved across a function call are assigned to registers in the non-preserved register pool. The static template entries remain unchanged during execution of the current function or section of the function.

Any remaining template entries are assigned to registers in the dynamic register pool, in order of use within the current function, on a round-robin basis (step 160). The contents of each dynamic register may change during execution of the current function. Assigning a template entry to a corresponding register in the dynamic register pool includes generating a machine code instruction that sets the register contents to the desired template entry value, as well as setting each memory access operation that corresponds to that template entry and that precedes a reassignment of the register contents to refer to the assigned template register. The dynamically-stored values need not be saved in memory or restored. A machine code instruction assigning an appropriate template entry value to a register may be simply inserted before a memory access operation that uses that template entry value.

In a step 160, the compiler generates instructions to save in memory the contents of preserved template entry registers. Saving the preserved template register contents allows restoration of the template entry registers when the current function has completed execution in response to a function call by a different function. For example, if a function fun1 includes a call to a function fun2, the prologue code of the function fun2 includes instructions to save in memory the preserved template entries of the function fun1, before loading into the preserved template registers a number of template entries for the function fun2. Before execution returns to the caller function fun1, the preserved template entries for function fun1 will be loaded into the template registers, as described below. In one embodiment, the preserved contents are saved on the stack, and the instructions to save the preserved template entries are inserted in the prologue code of the current function. The prologue code of a function performs set-up operations for the function, such as allocating space on the stack for variables and saving a stack pointer.

In a step 162, the compiler generates instructions to restore from memory the contents of preserved template registers that were used in the current function. The contents are restored before the system returns to executing a function that called the current function. In one embodiment, the instructions to restore the preserved template entries are inserted in the epilogue code of the current function. The epilogue code of a function generally dismantles the setup performed by the prologue code.

In one embodiment, a grouping scheme may be implemented to optimize template register usage, instead of or in conjunction with the static/dynamic template entry classification described above. In such a scheme, groups of template entries that tend to be used in close temporal proximity are loaded together into template registers before the template entries are needed. Such a grouping scheme may use fewer template registers than the static/dynamic scheme described above, but may require additional machine code instructions to set the template register contents to desired values. Such a grouping scheme may take advantage of the locality of some code. Consider for example a template entry used in a loop within a function. In the exemplary static/dynamic scheme described above, such a template entry may have a high weight throughout the function or a section of the function, even though the template entry may be needed only within the loop. Due to its high weight, the template entry may be assigned a static template register during the entire period of execution of the function or section. Another template entry, which may have a lower global weight but higher usage outside of the loop, would then be relegated to the dynamic template entry pool. In a grouping scheme, a group of templates having locally-high weights may be loaded into the template registers while the loop is executing, and replaced with another group of templates once the field usage of the function changes.

Figure 6:
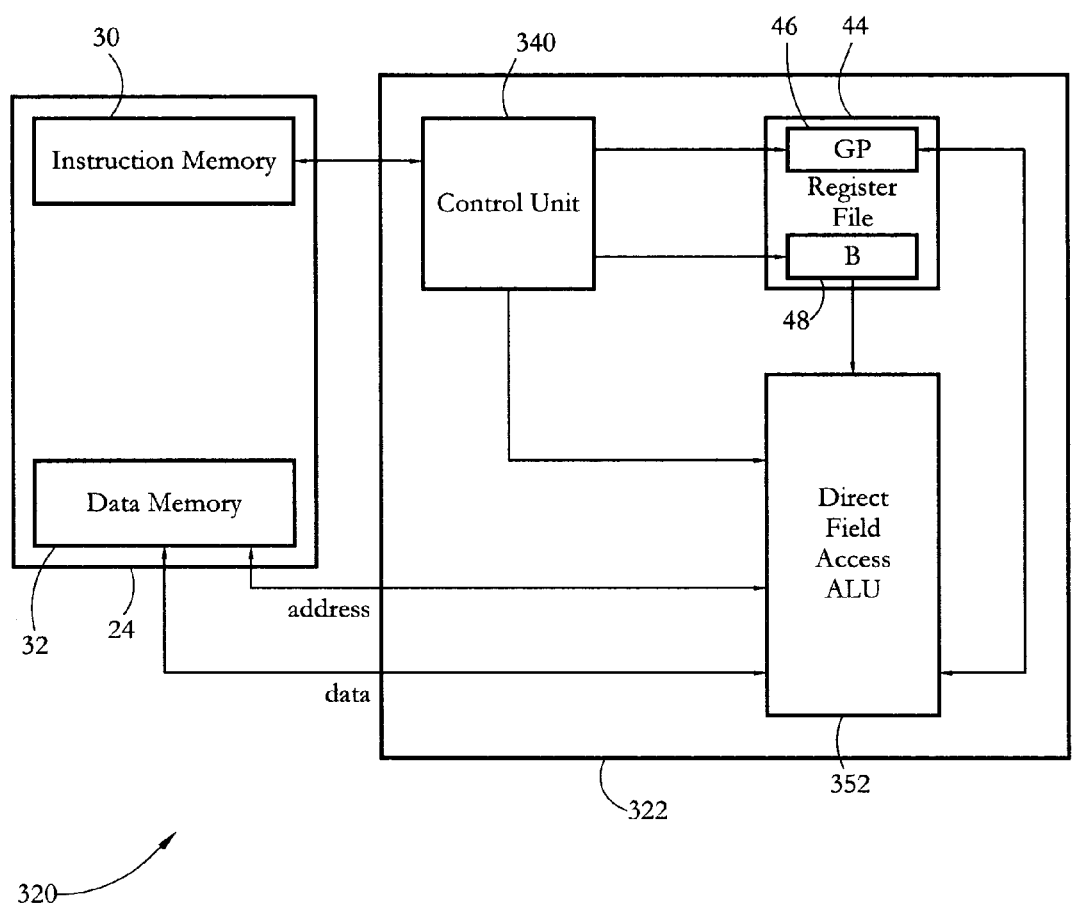
FIG. 6 is a schematic diagram of an exemplary data processing system according to some embodiments of the present invention.

FIG. 6 shows a diagram of a data processing system 320 according to another embodiment of the present invention. Data processing system 320 differs from the system 20 shown in FIG. 1 in that system 320 does not include template registers. The representation of system 320 in FIG. 6 also differs from that of system 20 in FIG. 1 in that the field-address and intra-word processing ALUs of FIG. 1 are represented as a single direct-field access ALU 352 in FIG. 6. ALU 352 may also include a general-purpose ALU of system 320. Control unit 340 retrieves a template entry from instruction memory 30 as part of a memory access (load/store) operation for an internal field of a data structure. Control unit 340 sends the template entry to field address ALU 352, which uses the template entry to generate a templated memory access command as described above. A compiler suited for generating machine code to be executed on system 320 generates machine code instructions that incorporate corresponding template entries in the instructions themselves. Such a compiler need not generate additional instructions for loading template registers. Since commonly-available buses have finite widths, incorporating template entries into instructions may limit the size of the template entries and the other instruction data.

The preferred templated/accelerated memory access methods described above allow a reduction in the number of machine code instructions needed to perform operations on internal fields of data structures. The direct load instructions lde and ldes allow directly loading an internal field of a data structure in a shifted position in a register, particularly if the internal field is stored in an internal position within a memory word offset from the base address of the data structure. The direct load instructions allow immediately executing further arithmetic operations on the field, without the necessity for additional shifting instructions. The direct-access instructions ldm and stm allow storing an updated version of such an internal data structure field using only two instructions. A masked-load instruction ldm zeroes-out the target field bitspan within a register, while a corresponding subsequent masked-store instruction stm stores the target field at its location within the target word. Additional masking and shifting operations are not required after execution of the two coupled instructions.

A conventional system and compiler may require a higher number of machine code operations than described in the preferred embodiments above. For example, in a conventional x86 architecture, loading an internal data structure field may require separate instructions to load an entire word in a first register, generate a mask in another register, and perform an AND or OR operation using the first register contents and the mask as operands.

The exemplary compiler steps described above illustrate only some potential ways of assigning template entries to a lower number of available template registers. Other assignment methods may be used to optimize template register usage, or to minimize the number of instructions used to load desired values into the template registers.

It will be clear to one skilled in the art that the above embodiments may be altered in many ways without departing from the scope of the invention. For example, some parameters (e.g. the memory address offset) may be included in the instructions themselves, while others (e.g. the field bitspan identifiers) may be included in template registers. Accordingly, the scope of the invention should be determined by the following claims and their legal equivalents.

What is claimed is:

1. A data processing apparatus comprising:
   a template storage unit storing a template having a plurality of entries, each template entry corresponding to an internal field of a data structure, each template entry specifying a memory address offset of a word relative to a base address of the data structure, and an internal field bitspan within the word, the field bitspan defining a field start position and a field length, the field bitspan being bounded by at least one intra-byte bit not forming a byte boundary;
   a base register storing the base address of the data structure;
   a target register;
   a control unit connected to the template storage unit and an instruction memory, comprising logic configured to
      receive from the instruction memory a machine language memory access instruction including an identifier of the base register and an identifier of a target template entry, the target template entry corresponding to a target field of the data structure, and
      transmit to the template storage unit the identifier of the target template entry;
   an internal-field address arithmetic logic unit connected to the base register, the template storage unit, and a data memory, comprising logic configured to
      receive the base memory address from the base register;
      receive a target memory address offset for the target field from the template storage unit,
      determine an address of the target field by adding the base memory address and target memory address offset; and
      transmit to the data memory a memory access command identifying the target memory address offset; and
   an intra-word processing arithmetic logic unit connected to the target register and the data memory, comprising logic configured to perform an intra-word content modification operation as at least part of a content of the word is transferred between the data memory and the target register.

2. The apparatus of claim 1, wherein the internal-field memory access instruction is a load instruction.

3. The apparatus of claim 2, wherein the load instruction is a load-and-extract instruction.

4. The apparatus of claim 2, wherein the load instruction is a load-extract-and-sign instruction.

5. The apparatus of claim 2, wherein the load instruction is a masked-load instruction.

6. The apparatus of claim 1, wherein the internal-field memory access instruction is a store instruction.

7. The apparatus of claim 6, wherein the store instruction is a masked-store instruction.

8. The apparatus of claim 1, wherein the intra-word content modification operation comprises an extraction of the internal field.

9. The apparatus of claim 1, wherein the intra-word content modification operation comprises an extraction of the internal field and an addition of at least one sign bit.

10. The apparatus of claim 1, wherein the intra-word content modification operation comprises masking a bitspan of the internal field within the word.

11. A data processing method comprising:
    receiving an internal-field memory access machine code instruction for an internal field of a data structure, the internal-field memory access machine code instruction including an identifier of a base register and an identifier of a target template entry, wherein
       the internal field occupies an internal field bitspan within a target word, the field bitspan defining a field start position and a field length, the field bitspan being bounded by at least one intra-byte bit not forming a byte boundary,
       the target word is distinct from a base word for the data structure,
       the base register stores a base memory address for the data structure, and
       the template entry specifies a memory address offset of the target word relative to the base memory address, and the internal field bitspan; and
    executing the internal-field memory access machine code instruction, wherein executing the internal-field memory access machine code instruction comprises
       determining an address of the target field by adding the base memory address and memory address offset, and
       performing an intra-word content modification operation as at least part of a content of the word is transferred between a memory and a data register.

12. The method of claim 11, wherein the internal-field memory access instruction is a load instruction.

13. The method of claim 12, wherein the load instruction is a load-and-extract instruction.

14. The method of claim 12, wherein the load instruction is a load-extract-and-sign instruction.

15. The method of claim 12, wherein the load instruction is a masked-load instruction.

16. The method of claim 11, wherein the internal-field memory access instruction is a store instruction.

17. The method of claim 16, wherein the store instruction is a masked-store instruction.

18. The method of claim 11, wherein the intra-word content modification operation comprises an extraction of the internal field.

19. The method of claim 11, wherein the intra-word content modification operation comprises an extraction of the internal field and an addition of at least one sign bit.

20. The method of claim 11, wherein the intra-word content modification operation comprises masking a bitspan of the internal field within the word.

* * * * *